2,734,056
FURANE-2-CARBOXYLIC ACID ESTERS OF 20:21-KETOLS OF THE PREGNANE SERIES

Karl Miescher, Riehen, and Peter Wieland, Basel, Switzerland, assignors to Ciba Pharmaceutical Products, Inc., Summit, N. J.

No Drawing. Application October 13, 1952,
Serial No. 314,562

Claims priority, application Switzerland October 18, 1951

4 Claims. (Cl. 260—239.55)

This invention relates to furane-2-carboxylic acid esters of therapeutically active 20:21-ketols of the pregnane series.

More particularly the invention relates to furane-2-carboxylic acid esters of 20-keto-21-hydroxy-pregnenes containing a keto, hydroxy or functionally converted keto or hydroxy group in the 3-position.

The principal 20:21-ketols of the pregnane series having theapeutic activity are the $\Delta^4$-3:20-diketo-21-hydroxy-pregnene, $\Delta^5$-20-keto-3:21-dihydroxy-pregnene, $\Delta^4$-3:20-diketo-11:21-dihydroxy-pregnene, $\Delta^4$-3:20-diketo-17$\alpha$:21-dihydroxy-pregnene, $\Delta^4$-3:20-diketo-11:17$\alpha$:21-trihydroxy-pregnene and $\Delta^4$-3:11:20-triketo-17$\alpha$:21-dihydroxy-pregnene.

The present invention is based on the observation that by the conversion of therapeutically active 20:21-ketols of the pregnane series into esters of furane-2-carboxylic acid, very valuable compounds can be obtained. Thus the $\Delta^4$-3:20-diketo-21-furoyl-(2)-oxy-pregnene possesses a considerably lower threshold value and is of more prolonged activity than the $\Delta^4$-3:20-diketo-21-acetoxy-pregnene which is known as a medicament. Moreover it also definitely surpasses, for example, the $\Delta^4$-3:20-diketo-21-benzoyloxy-pregnene, since it likewise possesses a lower threshold value than this compound.

The furane-2-carboxylic acid esters of the present invention may be obtained by conventional methods. Thus the furane-2-carboxylic acid or its reactive derivatives such as halides, esters or anhydrides, may be reacted with corresponding 20:21-ketols of the pregnane series in the presence or absence of condensing agents. Furthermore it is possible to react the furane-2-carboxylic acid or its salts with reactive esters of 20:21-ketols, especially those with the hydrohalic acids. The new esters can also be produced when the synthesis of the therapeutically active pregnane-20:21-ketols is carried out in such a manner that the 21-furoates are obtained directly. Thus it is especially advantageous to prepare the new esters starting from 21-diazoketones of the pregnane series and furane-2-carboxylic acid.

The following examples illustrate the invention, the relation between parts by weight and parts by volume being the same as that between the gram and cubic centimeter:

Example 1

2 parts by weight of desoxycorticosterone are dissolved in 5 parts by volume of absolute pyridine and, while cooling with ice and common salt, treated with 2 parts by volume of furane-2-carboxylic acid chloride. After standing for 40 hours at −15° C., the reaction product is precipitated with ice and water with additional cooling. The desoxycorticosterone-furoate-(2) of the formula

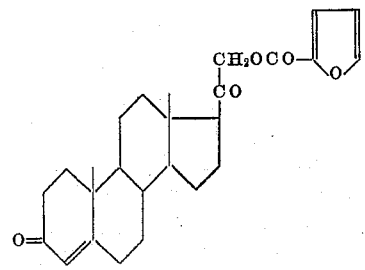

after filtration and washing with water, and after recrystallization from a mixture of acetone and methanol, melts at 178.5–179.5° C.; $[\alpha]_D^{21} = +208 \pm 4°$ ($c=1.00$ in chloroform).

Example 2

To 2 parts by weight of $\Delta^5$-3$\beta$-hydroxy-20-keto-21-diazo-pregnene and 20 parts by volume of xylene, 5 parts by weight of furane-2-carboxylic acid are added and the whole is heated until the evolution of nitrogen is complete. Then the product is treated with ether and extracted by shaking with dilute sodium carbonate solution and water. After drying with sodium sulfate and filtration, the ether-xylene solution is evaporated, first under normal pressure and then in a water jet vacuum. The 21-furoate of the $\Delta^5$-20-keto-3$\beta$:21-dihydroxy-pregnene, thus obtained, is oxidized by the Oppenauer method with cyclohexanone and aluminum isopropylate to form the desoxycorticosterone-furoate-(2). The latter, after recrystallization from a mixture of acetone and methanol, melts at 178.5–179.5° C.

Example 3

1 part by weight of $\Delta^4$-3:20-diketo-21-chloropregnene is treated with 50 parts by volume of dry acetone. After the addition of 1 part by weight of the finely powdered sodium salt of furane-2-carboxylic acid, the mixture is boiled for 10 hours under reflux. The cooled reaction mixture is thereupon treated with chloroform, ether and water. After washing, drying and evaporation of the organic solution, the residue is crystallized from a mixture of acetone and methanol. The furoate obtained of the desoxycorticosterone melts at 178.5–179.5° C.

Example 4

To a solution of 1 part by weight of $\Delta^4$-3:11:20-triketo-17$\alpha$:21-dihydroxy-pregnene in 10 parts by volume of dry pyridine there are added, while cooling with a mixture of ice and common salt, 2 parts by volume of furane-2-carboxylic acid chloride. The reaction mixture is allowed to stand overnight at −15° C. and then, while cooling, carefully treated with ice, the precipitated reaction product filtered off and washed with water. The filter residue is extracted by boiling with 30 parts by volume of acetone. The product, precipitated from the cooled solution, is thereupon recrystallized from a mixture of alcohol and chloroform. The Δ⁴-3:11:20-triketo-17α-hydroxy-21-furoyl-(2)-oxy-pregnene obtained, of the formula

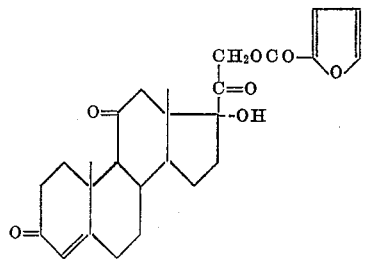

melts at 255–257° C.; [α]$_D^{20}$=+242° ±6° (c=0.544 in chloroform).

Example 5

1 part by weight of Δ⁴-3:20-diketo-17α:21-dihydroxy-pregnene is dissolved in 10 parts by volume of anhydrous pyridine and treated, with cooling in a mixture of ice and common salt, with 2 parts by volume of furane-2-carboxylic acid chloride. The reaction mixture is allowed to stand for 16 hours at −15° C. Then, with ice cooling, ice and then water are carefully added and the precipitated product is filtered. The filter residue, washed with water, is boiled with 30 parts by volume of acetone. The solution is thereupon cooled and allowed to crystallize. After recrystallization from a mixture of chloroform and alcohol, the Δ⁴-3:20-diketo-17α-hydroxy-21-furoyl-(2)-oxy-pregnene thus obtained, of the formula

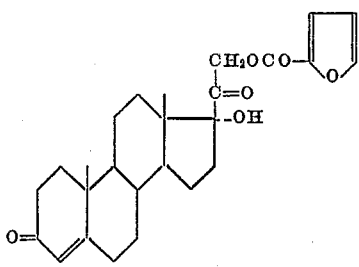

melts at 223–223.5° C.; [α]$_D^{20}$=+182° ±4° (c=0.900 in chloroform).

What is claimed is:
1. A member selected from the group consisting of Δ⁴-3:20-diketo-21-furoyl-(2)-oxy-pregnene of the formula

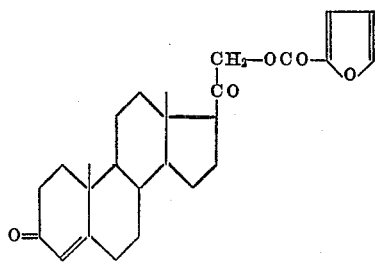

Δ⁴ - 3:20 - diketo - 17α - hydroxy - 21 - furoyl - (2) - oxy-pregnene of the formula

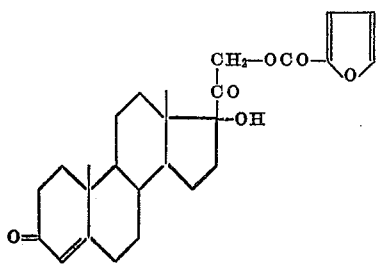

and Δ⁴-3:11:20-triketo-17α-hydroxy-21-furoyl-(2)-oxy-pregnene of the formula

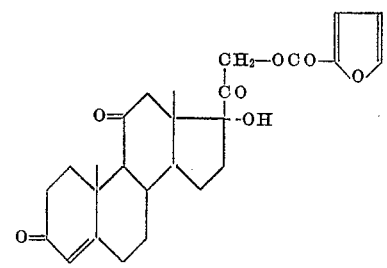

2. Δ⁴-3:20-diketo-21-furoyl-(2)-oxy-pregnene of the formula

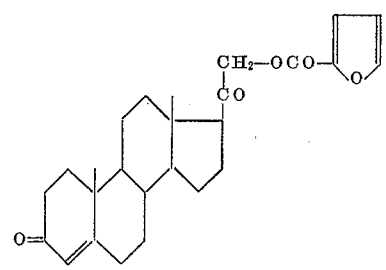

3. Δ⁴ - 3:20 - diketo - 17α - hydroxy - 21 - furoyl - (2) - oxy-pregnene of the formula

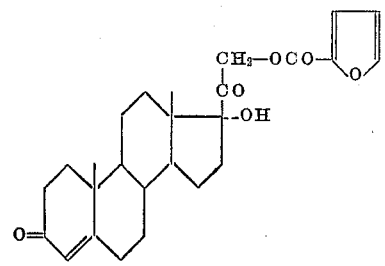

4. Δ⁴ - 3:11:20 - triketo - 17α - hydroxy - furoyl - (2) - oxy-pregnene of the formula

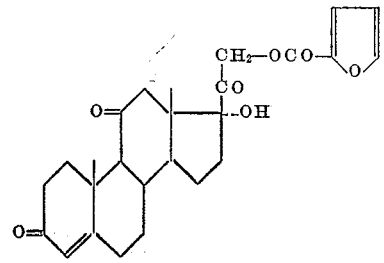

References Cited in the file of this patent
UNITED STATES PATENTS

| | | |
|---|---|---|
| 2,265,183 | Miescher | Dec. 9, 1941 |
| 2,510,940 | Sarett | June 13, 1950 |

OTHER REFERENCES
Morren, Chem. Abst., 1944, vol. 38, p. 2046.
Moorandian, Chem. Abst., vol. 44, p. 9469.